United States Patent [19]
Nara

[11] 3,886,855
[45] June 3, 1975

[54] APPARATUS FOR EFFICIENTLY ALPHIZING A LARGE MASS OF A CEREAL

[76] Inventor: Jiyuichi Nara, 14-9 Higashiooi 4-chome, Shingawa-ku, Tokyo, Japan

[22] Filed: Aug. 10, 1973

[21] Appl. No.: 387,240

Related U.S. Application Data
[62] Division of Ser. No. 303,025, Nov. 2, 1972.

[30] Foreign Application Priority Data
Jan. 17, 1972  Japan.................................. 47-6785

[52] U.S. Cl. ................. 99/323.11; 99/483; 99/516
[51] Int. Cl.............................................. A23l 1/18
[58] Field of Search ............. 99/447, 450, 483, 516, 99/517, 323.4, 323.5, 323.9, 323.11; 259/DIG. 17

[56] References Cited
UNITED STATES PATENTS

| | | | |
|---|---|---|---|
| 1,839,671 | 1/1932 | Hale............................ | 99/323.11 X |
| 2,637,625 | 5/1953 | Garbo........................... | 259/DIG. 17 |
| 3,385,199 | 5/1968 | Smith, Jr...................... | 259/DIG. 17 |
| 3,627,555 | 12/1971 | Driscoll......................... | 259/DIG. 17 |

*Primary Examiner*—Harvey C. Hornsby
*Assistant Examiner*—Alan Cantor
*Attorney, Agent, or Firm*—George B. Oujevolk

[57] ABSTRACT

An apparatus for converting a cereal for cattle food to an α-state which comprises treating the same in a stream of and through the medium of hot air or gas. The hot air or gas is injected into the cereal flow across the direction of progress of the cereal through a perforated plate which is inclined so that the progress of corns can be promoted. The apparatus in the form of a tower has two discharge outlets with a rotary valve each, one of the discharge outlets serves to discharge therefrom popped corn in the main, and the other unpopped corn in the main.

7 Claims, 1 Drawing Figure

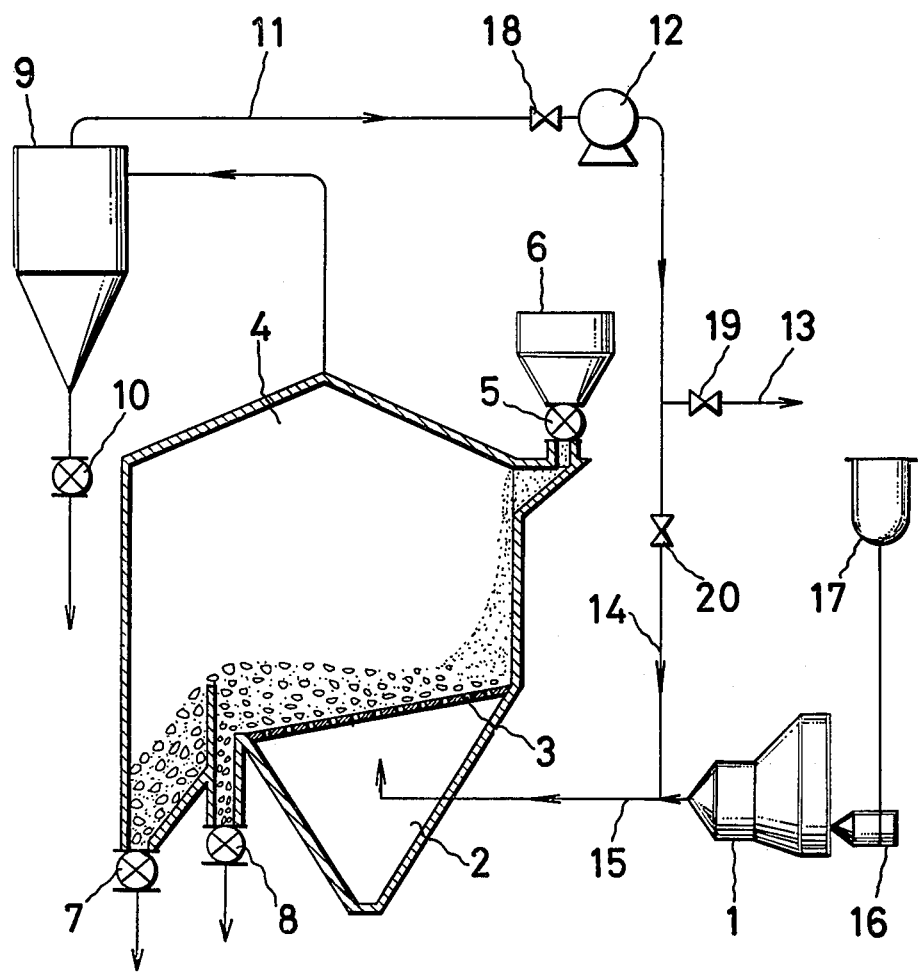

APPARATUS FOR EFFICIENTLY ALPHIZING A LARGE MASS OF A CEREAL

This is a division of application Ser. No. 303,025, filed Nov. 2, 1972.

This invention relates to an apparatus for efficiently alphizing a large mass of a cereal, for cattle food or the like, which has been allowed to stand in the air and contains a certain moisture at an equilibrium level, by fluidizing the cereal with a gas at elevated temperature.

For the purpose of the invention the term "alphizing" as used herein means a process in which the starch content of a cereal is converted from the raw $\beta$-state to the edible $\alpha$-state by the application of heat as by cooking.

Alphizing of cereals such as kaoliang and Indian corn has hitherto been accomplished in the following ways. A pressure cooker is filled with a cereal raw material and is directly heated from the outside up to a predetermined temperature and pressure, and then the pressure is released and reduced down to the atmospheric level. In an alternative method, which is typified by the alphizing (popping) of popcorn, a cereal is directly heated while being mixed with a cooking oil so that it can be thoroughly and uniformly heated with agitation through the medium of the oil. A further alternative is steam flaking, a process that relies upon steaming.

Those conventional processes have drawbacks of their own. Where a large quantity of a cereal is to be alphized to the form of livestock feed, the pressure cooking method has its limitations in the capacity per cooker and involves difficulties in mass production. The cereal contained in the pressure cooker at a high temperature may be partly burnt by the direct contact with the hot metallic wall of the vessel and, moreover, the operators are exposed to a constant danger in handling the cooker that requires high pressures for its operation. The method that employs oil as a heating medium is not only uneconomical in the case of mass processing but the resulting livestock feed may in many cases be deteriorated in quality by the use of oil. The steaming presents problems in the finish and preservation of the product.

Generally speaking, cereals contain certain equilibrium moistures (e.g., 10.5 – 13% W.B. for kaoliang and 9.5 – 12% W.B. for Indian corn) varying to some extent with the conditions of the air in which they are placed.

The moisture in a cereal, when heated suddenly to a high temperature, quickly reaches the boiling point and tends to evaporate at once. As a result, the cereal grains or kernels attain an explosive expansion in the volume (or popping) and thereby undergo alphizing as if cooked instantly.

Briefly, the present invention is a corn fluidizing tower or column comprising an inclined perforated plate at the bottom thereof. Hot gas is blown into the tower through the perforated plate in such a manner as to promote flow of corn or cereal thereacross. Outlets are provided to discharge treated product.

With the foregoing in view, the present invention has for its object to provide an apparatus for alphizing cereal grains in a fluidized state through a direct exposure to a hightemperature gas (hot air).

The object and advantages of the present invention will become more apparent from the following description taken in connection with the accompanying drawing wherein:

The single FIGURE is a schematic representation of an apparatus for practicing the invention.

In the FIGURE the apparatus is shown as comprising an air heating furnace 1, a hot air chamber 2, a perforated plate 3, a fluidizing column 4, a metering feeder 5, a feed hopper 6, rotary valves 7, 8, respectively, for underflow and overflow, and a cyclone 9 equipped with a rotary valve 10.

Cereal grains are continuously fed from the hopper 6 to the fluidizing column 4 via the metering feeder 5. Meanwhile, a stream of gas heated by the air heating furnace 1 is led to the hot air chamber 2 in the lower part of the fluidizing column via a duct 15. The gas fluidizes the cereal grains as it passes through the perforated plate. Having passed the fluidizing column 4, the gas enters the cyclone 9, where it is freed from minute particles (mostly of impurities). The purified gas then flows through a duct 11 into a blower 12. The recycling gas from the discharge end of the blower 12 is partly released out of the system through an exhaust port 13 for temperature control. The remainder is led as recycling gas (for the utilization of waste heat) through a recycling duct 14, so that it can be merged with the hot gas from the air heating furnace 1 and recycled together to the fluidizing column 4. Of the cereal grains alphized in the column 4, heavy ones are discharged through the underflow rotary valve 8 and the light ones through the overflow rotary valve 7. In the schematic view the reference numeral 16 indicates a fuel burner, 17 a fuel tank, 18 an air-gas flow control valve, 19 an exhaust gas control valve, and 20 a recycling gas flow control valve.

When a stream of hot gas is supplied to the fluidizing column in the manner described, it will be possible to obtain an $\alpha$-cereal of a given grain size with good reproducibility provided that the gas temperature and the retention time of the cereal in the gas stream are suitably chosen in advance. Since a cereal can be handled as a mass of solid grains of a relatively uniform size, a stream of hot gas is constantly supplied to the fluidizing column 4 at a sufficient flow rate and velocity for the alphizing of the cereal that is being continuously fed to the column. In this way the cereal grains are fluidized and give an alphized product characterized by a certain degree of volume expansion and moisture according to the processing conditions employed.

The invention has an additional advantage of removing impurities from a cereal in that impurities having different particle sizes or different specific gravities are driven out of the column by the classifying effect inherent to the fluidized bed and are centrifugally separated out by the cyclone 9 for subsequent recovery.

Also, the invention is applicable to the processing of cereals pretreated with water, an inorganic acid such as hydrochloric acid, an organic acid such as oxalic acid or acetic acid, or some other chemical. The residual moistures of the cereals alphized in accordance with the present invention are sufficient for the preservation of the foods and permit after-treatments, such as grinding and pulverization of the grains.

Because the alphizing of a cereal in accordance with the invention is completed within a very short period of time while the grains are being floated or suspended (fluidized) in a hot gas, the $\alpha$-product has little burnt smell or other offensive odor which is inevitable with conventionally processed cereals. Further, heat is highly utilized through the recycling of waste gas.

Moreover, safety is provided because the operation is for the most part performed at the conventional pressure (at most 200 mmAg). Thus, excellent $\alpha$-cereals can be mass produced with a high thermal efficiency.

The present invention is illustrated by the following non-limitative examples.

EXAMPLE 1

With the apparatus shown, Kaoliang containing a moisture of 10.3% W.B. was fed from the material feeder to the fluidizing column at a rate of 10.3 kg/hr (or the rate with which the alphized product was taken out). Simultaneously hot air was supplied to the column. The operating conditions used were as follows:

| (1) | Air temperature | 270°C |
|---|---|---|
| (2) | (Kaoliang) fluidizing rate | 1.9 m/sec |
| (3) | Fluidizing time | 55 sec. |
| (4) | Moisture of $\alpha$-product | 2.9% W.B. |

In this way excellently popped $\alpha$-kaoliang with a 7.5-fold volume expansion was obtained.

EXAMPLE 2

With the apparatus shown, kaoliang having a moisture of 13.2% W.B. was treated. The conditions were:

| (1) | Air temperature | 300°C |
|---|---|---|
| (2) | Fluidizing rate | 2.2 m/sec |
| (3) | Fluidizing time | 40 sec. |
| (4) | Moisture of $\alpha$-product | 3.5% W.B. |
| (5) | $\alpha$-Product output | 125 kg/hr |

In this way excellently popped $\alpha$-kaoliang with an 8.3-fold volume expansion resulted.

EXAMPLE 3

With the apparatus shown, Indian corn having a moisture of 9.6% W.B. was fluidized under the following conditions:

| (1) | Air temperature | 250°C |
|---|---|---|
| (2) | Fluidizing rate | 3.7 m/sec |
| (3) | Fluidizing time | 75 sec. |
| (4) | Moisture of $\alpha$-product | 1.6% W.B. |
| (5) | $\alpha$-Product output | 72 kg/hr |

An excellent half-popped $\alpha$-product with a 3.2-fold volume expansion was obtained in this way.

EXAMPLE 4

The same kaoliang as used in Examples 1 and 2 was alphized under varying conditions, at air temperatures of 150°– 380°C and fluidizing rates of 1.5 – 3.5 m/sec and for fluidizing periods of 30 – 150 sec. In this manner $\alpha$-products with 3.8- to 8.7-fold volume expansions were obtained.

What is claimed is:

1. An apparatus for converting a cereal to an $\alpha$-state comprising: a fluidizing column; a metering means for feeding the cereal material into said column; a hot air chamber positioned on the bottom thereof; an inclined perforated plate positioned between the hot air chamber and the fluidizing column for directing hot air at an inclination with respect to the vertical across the flow of cereals, said hot air flow also being in the general direction of cereal flow; an air heating furnace for supplying hot gas to the hot air chamber; and means for removing product from the column.

2. The apparatus of claim 1 wherein the means for taking out the product from the column comprise a plurality of rotary valves installed adjacent the lower end of the inclined perforated plate.

3. The apparatus of claim 2, including two rotary valves.

4. The apparatus of claim 1 wherein the fluidizing column is in communication with a cyclone.

5. The apparatus of claim 1, including a gas recycling circuit connected to said fluidizing column, comprising a cyclone, an air blower, and ducting for connecting the components to one another and with said column.

6. The apparatus of claim 5 wherein the gas recycling circuit is equipped with flow-rate controlling means.

7. An apparatus for converting a cereal $\alpha$-state comprising: a housing; means for feeding the cereal into said housing; an inclined perforated plate positioned in the bottom of said housing for injecting hot air into and across said cereal flow to assist the desired flow of said cereal down the plate incline; a hot air chamber under said perforated plate for directing hot air through said plate; classifying means adjacent the lower end of said perforated plate for removing product according to the weight of said product.

* * * * *